(12) United States Patent
Walley et al.

(10) Patent No.: US 10,797,489 B2
(45) Date of Patent: *Oct. 6, 2020

(54) SMART POWERING AND PAIRING SYSTEM AND RELATED METHOD

(71) Applicant: AVAGO TECHNOLOGIES INTERNATIONAL SALES PTE. LIMITED, Singapore (SG)

(72) Inventors: John Walley, Ladera Ranch, CA (US); Robert Hulvey, Redondo Beach, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,193

(22) Filed: Feb. 18, 2019

(65) Prior Publication Data

US 2019/0181649 A1    Jun. 13, 2019

Related U.S. Application Data

(63) Continuation of application No. 14/858,109, filed on Sep. 18, 2015, now abandoned, which is a
(Continued)

(51) Int. Cl.
*H02J 4/00* (2006.01)
*H02J 7/02* (2016.01)
(Continued)

(52) U.S. Cl.
CPC ...... *H02J 4/00* (2013.01); *H02J 5/00* (2013.01); *H02J 7/008* (2013.01);
(Continued)

(58) Field of Classification Search
CPC ....... H02J 2007/0096; H02J 2007/0098; H02J 7/0052; H02J 7/0055; H02J 7/025;
(Continued)

(56) References Cited

U.S. PATENT DOCUMENTS 6,255,800 B1   7/2001   Bork
6,754,092 B2   6/2004   McDowell et al.
(Continued)

FOREIGN PATENT DOCUMENTS

EP         1635508 A1    3/2006
WO      2010/057224 A1    5/2010

OTHER PUBLICATIONS

Chinese Office Action dated Nov. 22, 2013, in corresponding application 201210004160.4.
(Continued)

*Primary Examiner* — Mirza F Alam
(74) *Attorney, Agent, or Firm* — Xsensus LLP

(57) ABSTRACT

According to one disclosed embodiment, a smart powering and pairing system includes a power conversion unit (PCU) having a communication module, a power management module and a pairing module. The PCU can convert mains power into a form that can be used to power a plurality of electronic devices. In one embodiment, the PCU can transparently pair a connected electronic device to a group of subsequently connected electronic devices by accepting pairing information from the connected electronic device and using it to pair the subsequently connected devices. In another embodiment, the PCU can transparently pair a group of connected electronic devices by applying generated security data to all the connected devices. In another embodiment, a power conversion unit can use security data to un-pair connected electronic devices.

17 Claims, 2 Drawing Sheets

Related U.S. Application Data continuation of application No. 13/004,836, filed on Jan. 11, 2011, now Pat. No. 9,178,363.

(60) Provisional application No. 61/336,845, filed on Jan. 26, 2010.

(51) Int. Cl.
    H02J 7/00      (2006.01)
    H02J 5/00      (2016.01)
    H02J 50/10     (2016.01)
    H02J 50/12     (2016.01)
    H02J 50/80     (2016.01)

(52) U.S. Cl.
    CPC ............ *H02J 7/00036* (2020.01); *H02J 7/02* (2013.01); *H02J 7/022* (2013.01); *H02J 50/10* (2016.02); *H02J 50/12* (2016.02); *H02J 50/80* (2016.02); *H02J 7/0021* (2013.01); *Y10T 307/406* (2015.04)

(58) Field of Classification Search
    CPC ........ H02J 7/008; H02J 7/0026; H02J 7/0068; G06F 1/1632
    USPC .......... 340/13.23, 636.2; 307/29, 31, 34, 38, 307/104, 126; 455/573; 320/103, 107, 320/108, 137, 124
    See application file for complete search history.

(56) References Cited

U.S. PATENT DOCUMENTS

| | | |
|---|---|---|
| 7,573,159 B1 | 8/2009 | Deluliis et al. |
| 7,766,698 B1 | 8/2010 | De Luliis et al. |
| 2006/0271800 A1 | 11/2006 | Li et al. |
| 2008/0008359 A1 | 1/2008 | Beenau et al. |
| 2008/0081676 A1 | 4/2008 | Chakraborty et al. |
| 2008/0106148 A1 | 5/2008 | Gelonese |
| 2008/0166968 A1 | 7/2008 | Tang et al. |
| 2009/0235107 A1 | 9/2009 | Gelonese |
| 2009/0271047 A1* | 10/2009 | Wakamatsu ............ H02J 5/005 700/295 |
| 2009/0284245 A1* | 11/2009 | Kirby .................. G06K 7/0008 323/318 |
| 2010/0019583 A1 | 1/2010 | DuBose et al. |
| 2010/0145542 A1 | 6/2010 | Chapel et al. |
| 2010/0146308 A1* | 6/2010 | Gioscia ................ G06F 1/1632 713/300 |
| 2010/0244576 A1* | 9/2010 | Hillan ................. G06K 7/0008 307/104 |
| 2010/0279606 A1 | 11/2010 | Hillan et al. |
| 2011/0159813 A1* | 6/2011 | Mallinson ............ H04M 1/7253 455/41.2 |
| 2011/0260556 A1 | 10/2011 | Partridge et al. |

OTHER PUBLICATIONS

"Combined Antenna and Inductive Power Receiver" Ben-Shalom, et al. Apr. 1, 2010 <http://www.sumobrain.com/patents/wipo/Combined-antenna-inductive-12ower-receiver/WO2010035256.html>.

"Verizon LG Decoy Cell Phone Integrated Bluetooth Headset Now Available" Andrew Tingle Jun. 17, 2008 <http://nexus404.com/Blog/2008/06/17/verizon-lg-decoy-cell-phone-integrated-bluetooth-headset-now-available-lg-vx8610-multimedia-handset-hits-verizon/>.

\* cited by examiner

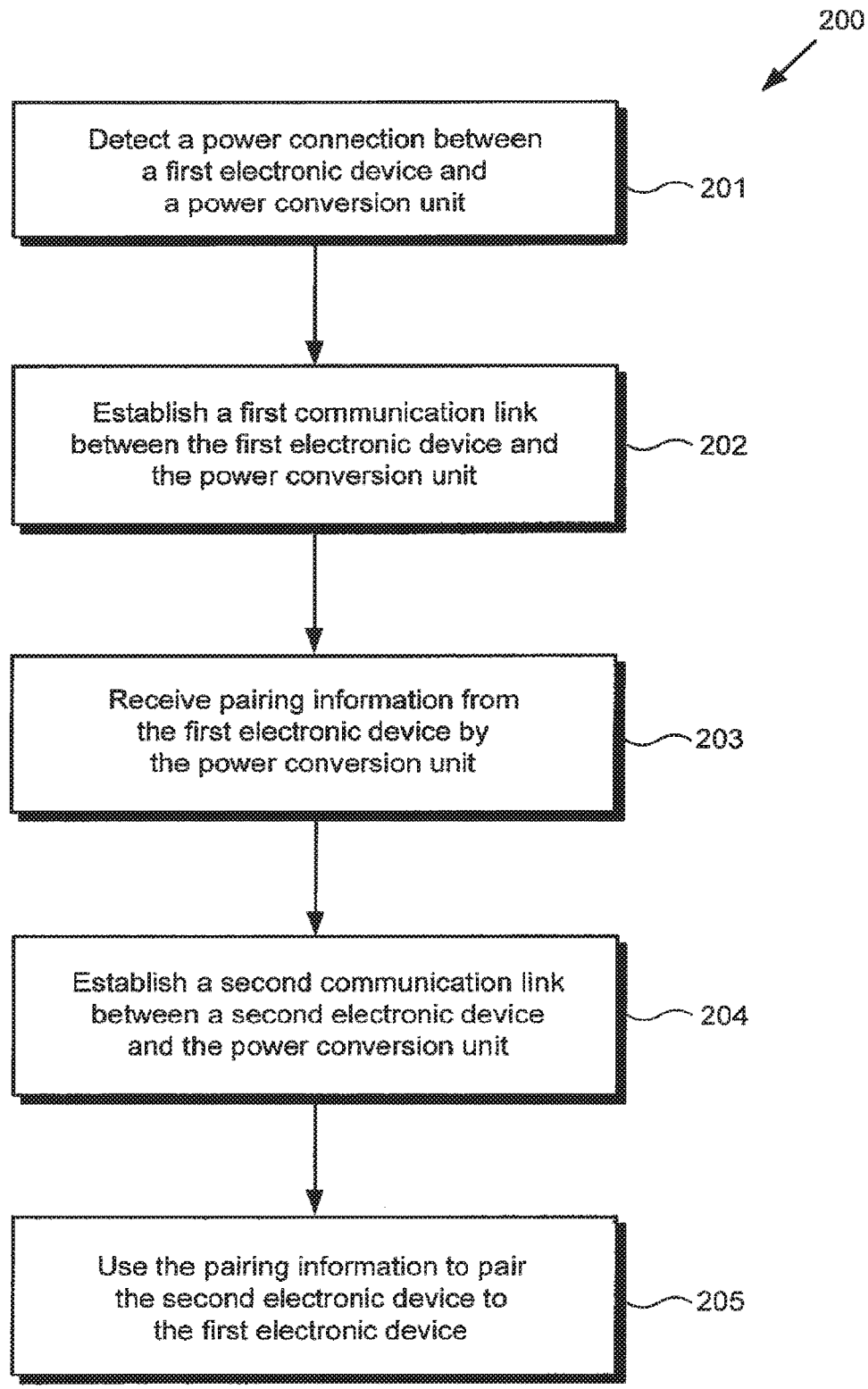

SMART POWERING AND PAIRING SYSTEM AND RELATED METHOD

RELATED APPLICATIONS

This application is a Continuation of U.S. application Ser. No. 14/858,109, filed Sep. 18, 2015, which is a continuation of U.S. application Ser. No. 13/004,836, filed Jan. 11, 2011, now U.S. Pat. No. 9,178,363, issued on Nov. 3, 2015, which claims priority to U.S. Provisional Patent Application No. 61/336,845, filed on Jan. 26, 2010, the contents of which are hereby incorporated by reference in their entirety.

BACKGROUND OF THE INVENTION

1. Field of the Invention

The present invention is generally in the field of electronic devices and systems. More particularly, the present invention is in the field of delivery of power to electronic devices and systems.

2. Background Art

The use of personal electronic devices permeates almost all aspects of daily life. Many such devices are kept in a mode of constant readiness for use, and the cumulative effect of this mode and the ever-increasing number of devices can be a heavy burden on existing energy resources. Further, as more and more feature innovations are brought to market, the complexity in leveraging those features often surpasses the conveniences they offer.

One such feature is the act of pairing one electronic device to one or more other electronic devices in order to combine features without requiring that one device incorporate all desired features all the time. While the distributed functionality opens up a wide range of new, desired cooperative features, pairing devices to enable the cooperative features can entail many individual manual steps that may require more than just a general comfort level with new technology to complete.

Moreover, conventional power supplies for electronic devices are typically unconfigurable and feature-poor, possibly just to reduce manufacturing cost, but perhaps also because general safety and liability concerns steer manufacturers towards designing their power supplies to be physically differentiated from product to product so as to limit the risk of damage due to incompatible voltage and current specifications. Because each power supply is typically designed to serve only a very limited market for a limited amount of time (e.g., the life of a single product), on the whole, there can be little incentive to design efficiency or convenience features into each iteration of a generic power supply. Additionally, in the case of portable electronic devices, the lack of interchangeability frequently leads to consumers having multiple collections of power supplies at, for example, home and work; which can serve to compound the waste and inconvenience normally indicative of conventional power supplies and powering systems.

Thus, there is a need to overcome the drawbacks and deficiencies in the art by providing a powering system that can be readily adapted to power various electronic devices efficiently and accurately while increasing the convenience of using those electronic devices.

SUMMARY OF THE INVENTION

The present invention is directed to a smart powering and pairing system and related method, substantially as shown in and/or described in connection with at least one of the figures, as set forth more completely in the claims.

BRIEF DESCRIPTION OF THE DRAWINGS

FIG. 2 shows a flowchart illustrating steps taken to implement a method for pairing electronic devices, according to an embodiment of the present invention.

DETAILED DESCRIPTION OF THE INVENTION

Figure 1:
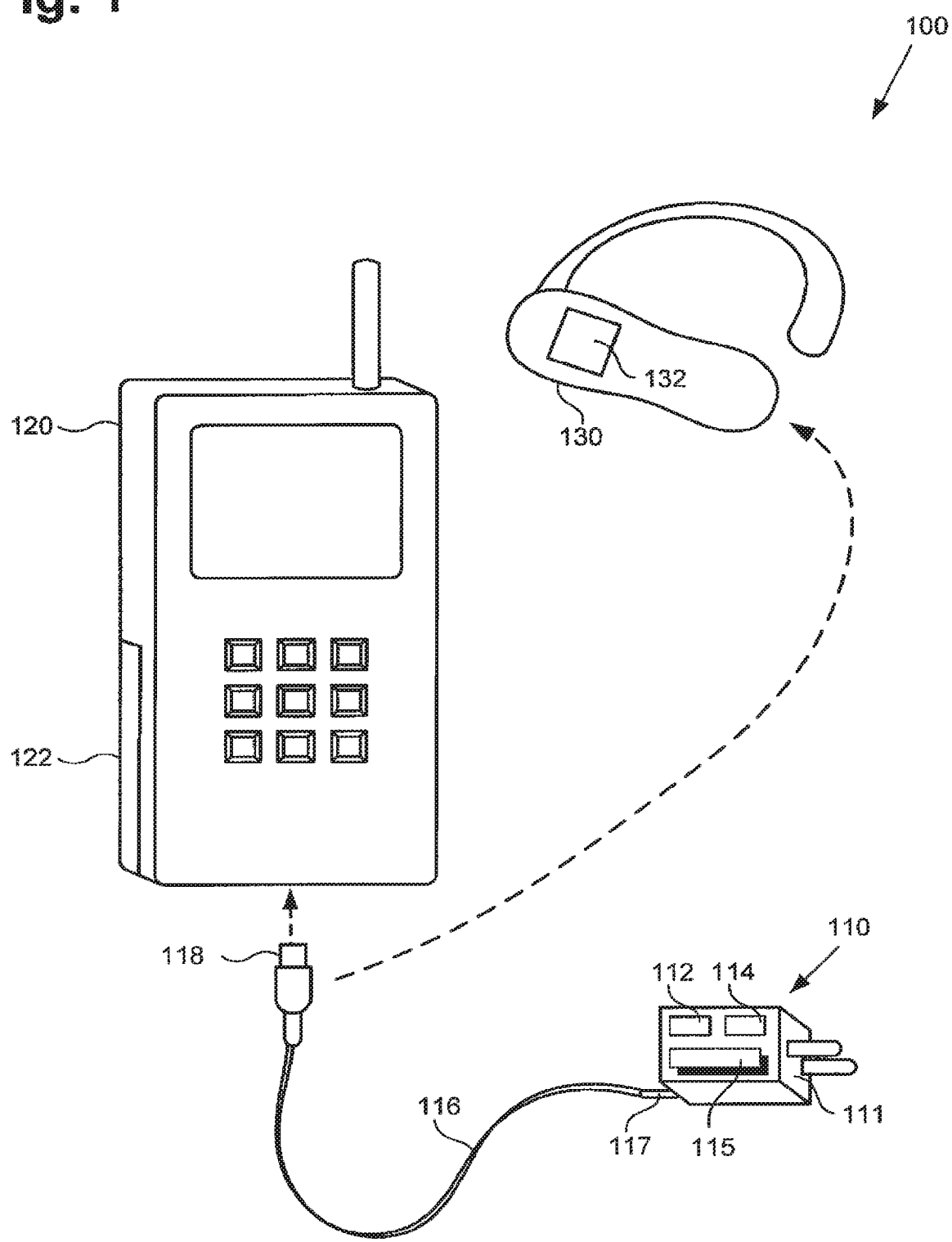
FIG. 1 illustrates a modular view of a smart powering and pairing system, according to one embodiment of the present invention.

The present invention is directed to a smart powering and pairing system and related method. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings. It should be understood that unless noted otherwise, like or corresponding elements among the figures may be indicated by like or corresponding reference numerals. Moreover, the drawings and illustrations in the present application are generally not to scale, and are not intended to correspond to actual relative dimensions.

Many modern electronic devices include the capability to communicate with other devices in order to enhance the convenience of their use. To reduce cross talk and/or to transfer information securely, electronic devices can be "paired" or grouped in a way that makes their communications distinguishable from communications with other devices. While pairing has become an important way to combine functionality of multiple electronic devices, the initial step of pairing one device with another can be complex, time consuming, and exceedingly inconvenient, especially as electronic devices themselves become more complex.

Conventional power delivery systems may not be suitable to solve this inconvenience because they typically cannot be used universally. At the end of the life of a typical electronic device, its power delivery system is often simply thrown away because it cannot function with other electronic devices. Knowing this, manufactures typically build their power delivery systems as cheaply as possible, which can preclude incorporating any significant convenience features into their design.

FIG. 1 illustrates a modular view of one embodiment of the present invention that is capable of overcoming the drawbacks and deficiencies of the conventional art. Smart power management system 100, in FIG. 1, includes power conversion unit (PCU) 110, electronic devices 120 and 130, and wired power conduit 116. According to the embodiment shown in FIG. 1, PCU 110 can be configured to connect to a mains alternating current (AC) power line through a standard wall mounted electrical socket, using mains adapter 111, and to provide power to electronic device 120 or 130 using wired power conduit 116.

As shown in FIG. 1, wired power conduit 116 can be connected to PCU 110 through connector 117, which may be a fixed connection or a detachable modular connection, such as through a Universal Serial Bus (USB) interface plug-in connector, for example. Wired power conduit 116 can connect PCU 110 to electronic device 120 or 130 through modular connector 118, which may be a mini-USB connector, for example, or any modular connector suitable for providing an interface between wired power conduit 116 and an electronic device or system receiving power. Wired power conduit 116 can serve as a power transfer connection between PCU 110 and electronic device 120 or 130 and can be used to transfer power to operate either electronic device and/or charge their batteries (e.g., battery 122 of electronic device 120 or battery 132 of electronic device 130).

Although the embodiment shown in FIG. 1 represents PCU 110 connected only one electronic device at a time, e.g., electronic device 120 or 130, that representation is provided merely as an example. More generally, PCU 110 may be configured to provide power to a plurality of various individual electronic devices and/or systems, each having their own specific power requirements, by, for example, including multiple power conduits connecting each device to PCU 110 substantially simultaneously. Alternatively, PCU 110 may be configured to provide a variable output to any of a plurality of electronic devices, but to do so in combination with a single electronic device or system at a time. In any implementation, however, PCU 110 is configured to support a communication channel between itself and the electronic devices or systems to which it is connected.

As shown in FIG. 1, according to the embodiment of smart power management system 100, PCU 110 includes communication module 112, power management module (PMM) 114, and pairing module 115. Communication module 112 can be configured to send and receive information (e.g., state information, power management parameters and/or pairing information) between PCU 110 and electronic devices 120 and 130, for example, over communication channels established between PCU 110 and electronic devices 120 and 130.

In embodiments such as that shown in FIG. 1, in which power is transferred from PCU 110 to electronic device 120 over a wired connection (e.g., wired power conduit 116) the wired connection may also provide a communication channel for transfer of information. In different embodiments, power may instead be transferred through a wireless power conduit (not shown in FIG. 1) by inductive coupling, or resonant inductive coupling, for example, as known in the art. In those embodiments, communication module 112 can be configured to use a wireless power conduit as a wireless communication channel. Communication module 112 can also be configured to support separate wireless communication channels to electronic devices 120 and 130, such as through a Bluetooth, Bluetooth LE, WiFi, Near Field Communication (NFC), or other suitable wireless communication protocol, for example, either in addition or as an alternative to a communication channel formed over a power conduit.

PMM 114 may comprise, for example, a microcontroller having multiple digital and analog input/output ports coupled to communications module 112 and to, for example, a programmable variable power supply, as known in the art, PMM 114 can be configured to use information received from communication module 112 to dynamically modify the output power characteristics (e.g., current and voltage levels) of power delivered to, for example, electronic device 120 or 130 in order to efficiently and accurately power electronic device 120 or 130 or charge respective batteries 122 or 132. PMM 114 can also be configured to detect a power connection with an electronic device by sensing, for example, a change in output impedance as measured across a power conduit.

In one example, the combined efforts of communication module 112 and PMM 114 can be used to enable PMM 114 to regulate the output power characteristics of power delivered to electronic device 120 according to information (e.g., power management parameters) exchanged between, for example, electronic device 120 and PCU 110 over a communication channel. Consequently, embodiments of the present invention can be used to provide power to many different electronic devices, which can dramatically extend the useful lifetime of PCU 110 while reducing a need for multiple conventional matched power supplies.

Pairing module 115 may comprise, for example, a microcontroller having multiple digital and analog input/output ports coupled to communications module 112 and to, for example, a data storage device (e.g., a flash memory device, or a bank of static random access memory) as known in the art. Pairing module 115 can be configured to use, for example, pairing information received from communication module 112 to pair electronic devices (e.g., electronic devices 120 and 130) when they are placed in communication with PCU 110. Once paired, electronic devices 120 and 130 can be configured to communicate with each other securely, exclusively, and/or transparently (e.g. without additional help from a user or PCU 110) as known in the art, for example. Such post-pairing configurations may be defined by instructions comprising a portion of the pairing information received by pairing module 115 and used to pair electronic devices 120 and 130. Pairing module 115 can also be configured to store all such pairing information and/or other transmitted information for subsequent use when, for example, pairing other electronic devices.

Alternatively, or in addition to the above, paring module 115 may also comprise a physical authentication device, not shown in FIG. 1, that can be used to enable or disable a pairing function of pairing module 115. For example, a physical authentication device may comprise a fingerprint scanner, or an electronic key fob detector for recognizing an electronic key fob exhibiting, for example, a specific electronic signature, as known in the art. Pairing module 115 can be configured to temporarily enable a pairing function after a successful authentication of pairing module 115, for example, such as when a scanned fingerprint matches another previously stored in pairing module 115, or while the presence of a specific electronic key fob is detected by PCU 110.

Although not shown in FIG. 1, PCU 110 may also include various user interaction devices, such as lighted status indicators, or physical switches, for example, that can be coupled with any modules comprising PCU 110. A lighted status indicator may comprise, for example, a colored light emitting diode (LED) or strip of LEDs configured to indicate a communication link status of communication module 114, for example, or a failed authentication of pairing module 115. A physical switch may comprise, for example, a momentary push-button switch that can be configured to communicate, for example, to pairing module 115 that a pairing function must be restarted with new pairing information because an already paired device has been lost or compromised, for example.

FIG. 2 shows a flowchart illustrating a method for pairing an electronic device to another according to an embodiment of the present invention. Certain details and features have been left out of flowchart 200 that are apparent to a person of ordinary skill in the art. For example, a step may consist of one or more substeps or may involve specialized equipment or materials, as known in the art. Steps 201 through 205 indicated in flowchart 200 are sufficient to describe one embodiment of the present invention; however, other embodiments of the invention may make use of steps different from those shown in flowchart 200.

Referring now to step 201 of the method embodied in FIG. 2, step 201 of flowchart 200 comprises detecting a power connection between a first electronic device and a PCU. The first electronic device may be, for example, any electronic device able to communicate with a PCU and pair with other electronic devices, and it may or may not have an internal power storage device, such as a battery. The PCU can comprise a communication module, a PMM and a pairing module, and can be configured to draw power from a mains adapter, such as PCU 110 of FIG. 1 described above. As explained above, a RUN of the PCU may be configured to sense, for example, a change in output impedance over a power conduit and detect a power connection with the PCU.

Continuing with step 202 in FIG. 2, step 202 of flowchart 200 comprises establishing a first communication link between the first electronic device and the PCU. The first communication link may be over a wired or wireless power conduit, a wired or wireless communication channel, or any combination of those, and can be established, for example, by a communication module working in conjunction with a pairing module and/or a PMM.

Moving now to step 203 in FIG. 2, step 203 of flowchart 200 comprises the PCU receiving pairing information from the first electronic device. Upon a communication link being established, as described in step 202, either the PCU or the electronic device may initiate a transfer of pairing information by, for example, transmitting an identity description used to distinguish devices to be paired from other devices, or by requesting a numerical authentication key or other security data. An identity description may comprise an electronic device's serial number, universal product code (UPC), network address, manufacturer, model number, or any other collection of numbers, symbols or text that can distinguish one or more electronic devices from other electronic devices. Security data, on the other hand, may comprise any data that can distinguish a communication of one or more electronic devices from other communications, for example, or data that can be used to secure communications generally, as known in the art. Pairing information transfer may begin transparently (e.g., without any intervention by a user), for example. Further, any pairing information received by the PCU may be stored within the pairing module of the PCU, as described above.

Continuing with step 204 in FIG. 2, step 204 of flowchart 200 comprises establishing a second communication link between a second electronic device and the PCU. The second communication link may be completely independent of the first communication link, and, like the first communication link, may be over a wired or wireless power conduit, a wired or wireless communication channel, or any combination of those. The second communication link can be established, for example, by a communication module working in conjunction with a pairing module and/or a PMM, and can operate substantially simultaneously with the first communication link.

Moving now to step 205 in FIG. 2, step 205 of flowchart 200 comprises using the pairing information to pair the second electronic device to the first electronic device. Pairing may happen transparently, and may or may not continue for an extended period of time. For example, if the pairing information transmitted to the PCU by the first electronic device comprises an identity description, as described above the PCU's pairing module may request an identity description from the second electronic device and compare it to, for example, a stored version of the identity description transmitted by the first electronic device. If the identity descriptions match, then the PCU can pair the devices by, for example, transmitting security data (e.g., an authentication key) generated by the PCU to both devices. Alternatively, even in instances in which the identity descriptions do not match, the PCU can be configured to pair the devices if they meet certain predetermined criteria, once again, for example, by transmitting security data, such as an authentication key, generated by the PCU to both devices. After such a transmission, the devices may communicate with each other using security data to negotiate, for example, a secure communication protocol, as known in the art. Such a secure communication protocol can be used to transmit any information over any communication channel formed between the first and second electronic devices, including those communication channels supporting the previously formed first and second communication links with the PCU.

If, instead of an identity description, the pairing information transmitted by the first electronic device comprises security data (e.g., an already generated authentication key), then the PCU can be configured, for example, to simply re-transmit the security data to any electronic device it subsequently communicates with, such as the second electronic device, and thereby pair the second device to the first electronic device, as described above.

In an example implementation of the above method, a PCU can be configured to retain pairing information sent by a first electronic device, for example, only for a limited time or until some event occurs, as a security feature. For instance, a PCU may receive pairing information from a first electronic device comprising security data and an instruction that only the next device connected to the PCU is to be paired. If a third electronic device is connected to the PCU after a second electronic device has been paired, as described above, for example, that third device may be powered by the PCU, but may not be paired with the other electronic devices because the pairing information provided by the first electronic device has not been retained by the PCU. Under other circumstances, pairing information may instead comprise an instruction to pair all devices connected to a PCU at the same time, for example, or all devices connected to a PCU over a period of time.

In the event that the security of an electronic device paired by a PCU is compromised ire some way, or if a user wishes to un-pair electronic devices conveniently, a PCU may be configured instead to un-pair electronic devices in much the same way as it may be used to pair them. For example, a first device may transmit paring information to a PCU that comprises a pairing group's identity descriptions and an instruction to un-pair all devices in that pairing group. Using that information, a PCU can be configured to un-pair, transparently, any electronic devices in that pair group that are subsequently connected to the PCU. Alternatively, as mentioned above, a PCU may comprise a user selectable switch that can be used to restart a pairing function of the PCU. Upon such a switch being selected, a PCU can be configured to un-pair all currently connected electronic devices from their pair group or groups, for example, and re-pair all the devices as a single pair group using newly generated authentication key, for example.

Although the method described by flowchart 200 characterizes the transfer of pairing information as occurring through a first connection of a first electronic device with the PCU and transfer of the pairing information from the first electronic device to the PCU, then disconnection of the first electronic device from the PCU, followed by connection of a second electronic device to the PCU and transfer of the pairing information from the PCU to the second electronic device, that is but an example arrangement. In another embodiment, a first electronic device can be connected to a PCU having existing connections, e.g., wired, wireless, or both wired and wireless, to one or more other electronic devices. In that embodiment, transfer of pairing information from the first electronic device to the PCU could be followed by substantially immediate transfer of the pairing information to one or more of the other connected devices, without additional intervening disconnect or connect operations.

Therefore, by providing a smart powering and pairing system having the ability to communicate with and power a variety of connected electronic devices, and also having the ability to pair those devices transparently, the present inventive concepts provide a powering system that can significantly increase the convenience of using those electronic devices. Additionally, by providing a system that can transparently facilitate secure transfer of information between connected electronic devices over, for example, mixed communication channels (i.e., one a wired communication channel formed over a wired power conduit and another formed over a wireless communication channel separate from a power conduit, for example), the present inventive concepts compound the above increase in convenience while retaining important communication security features.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive, it should also be understood that the invention is not limited to the particular embodiments described herein but is capable of many rearrangements, modifications, and substitutions without departing from the scope of the invention.

What is claimed is:

1. A power management device, comprising:
    processing circuitry configured to:
        detect a power connection between the power management device and a first electronic device;
        receive a power management parameter from the first electronic device;
            regulate, according to the power management parameter, an output power characteristic of power provided to the first electronic device;
        send a first identity information request to the first electronic device;
            receive first information from the first electronic device, the first information including a first identifier that identifies the first electronic device and a target identifier that identifies another electronic device;
        send a second identity information request to a second electronic device;
            receive second information from the second electronic device, the second information including a second identifier that identifies the second electronic device;
        determine whether the second identifier corresponds to the target identifier; and
        in response to the second identifier corresponding to the target identifier, pair the first electronic device with the second electronic device.

2. The power management device according to claim 1, wherein the processing circuitry is further configured to provide the power via the power connection to the first electronic device.

3. The power management device according to claim 1, wherein the processing circuitry is further configured to detect a second power connection between the power management device and the second electronic device.

4. The power management device according to claim 3, wherein the processing circuitry is further configured to:
    provide a first power output to the first electronic device via the power connection; and
    provide a second power output to the second electronic device via the second power connection, the second power output being different than the first power output.

5. The power management device according to claim 1, wherein the power connection is a wired connection.

6. The power management device according to claim 1, wherein the power connection is a wireless connection.

7. The power management device according to claim 1, wherein the processing circuitry is further configured to transmit an authentication key to both the first electronic device and the second electronic device.

8. The power management device according to claim 1, wherein the processing circuitry is configured to retain the first identifier until a predetermined event occurs.

9. The power management device according to claim 1, wherein the processing circuitry is further configured to un-pair the first electronic device and the second electronic device.

10. The power management device according to claim 9, wherein the processing circuitry un-pairs the first electronic device and the second electronic device in response to a user input.

11. A power management system, comprising:
    a first electronic device including first processing circuitry; and
    a power management device including second processing circuitry that is configured to:
        detect a power connection between the power management device and the first electronic device;
        receive a power management parameter from the first electronic device;
            regulate, according to the power management parameter, an output power characteristic of power provided to the first electronic device;
            receive first information from the first electronic device, the first information including a first identifier that identifies the first electronic device and a target identifier that identifies another electronic device;
            receive second information from a second electronic device, the second information including a second identifier that identifies the second electronic device;
        determine whether the second identifier corresponds to the target identifier; and in response to the second identifier corresponding to the target identifier, pair the first electronic device with the second electronic device.

12. The power management system according to claim 11, wherein the processing circuitry is further configured to provide the power via the power connection to the first electronic device.

13. The power management system according to claim 11, wherein the second processing circuitry is further configured to detect a second power connection between the power management device and the second electronic device.

14. The power management system according to claim 13, wherein the second processing circuitry is further configured to:
provide a first power output to the first electronic device via the power connection; and
provide a second power output to the second electronic device via the second power connection, the second power output being different than the first power output.

15. The power management system according to claim 11, wherein the second processing circuitry is further configured to transmit an authentication key to both the first electronic device and the second electronic device.

16. A power management device, comprising:
processing circuitry configured to:
receive first information from a first electronic device, the first information including:
a first identifier that identifies the first electronic device,
a target identifier that identifies another electronic device, and
a power management parameter for regulating power output to the first electronic device;
provide power to the first electronic device and regulate, according to the power management parameter, an output characteristic of the power provided to the first electronic device;
receive second information from the second electronic device, the second information including a second identifier that identifies the second electronic device;
determine whether the second identifier corresponds to the target identifier; and
in response to the second identifier corresponding to the target identifier, pair the first electronic device with the second electronic device.

17. The power management device according to claim 16, wherein
the power provided to the first electronic device has a first power characteristic,
the processing circuitry is configured to provide power to the second electronic device having a second power characteristic that is different from the first power characteristic.

* * * * *